(12) United States Patent
Cho et al.

(10) Patent No.: US 12,703,225 B2
(45) Date of Patent: Aug. 11, 2026

(54) VEHICLE AND METHOD OF SUPPORTING SOUND INPUT/OUTPUT FOR THE SAME

(71) Applicants: Hyundai Motor Company, Seoul (KR); Kia Corporation, Seoul (KR)

(72) Inventors: Jin Kyeom Cho, Suwon-si (KR); Sang Hun Jung, Suncheon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 198 days.

(21) Appl. No.: 18/178,053

(22) Filed: Mar. 3, 2023

(65) Prior Publication Data

US 2024/0174049 A1 May 30, 2024

(30) Foreign Application Priority Data

Nov. 29, 2022 (KR) ........................ 10-2022-0162850

(51) Int. Cl.
*B60H 1/00* (2006.01)
*G10L 15/20* (2006.01)
*G10L 15/22* (2006.01)

(52) U.S. Cl.
CPC .......... *B60H 1/00757* (2013.01); *G10L 15/20* (2013.01); *G10L 15/22* (2013.01); *G10L 2015/223* (2013.01)

(58) Field of Classification Search
None
See application file for complete search history.

(56) References Cited

U.S. PATENT DOCUMENTS

2003/0023432 A1* 1/2003 Kyomitsu ............... G10L 15/20 704/231
2015/0224848 A1* 8/2015 Eisenhour ............ B60H 1/0075 62/186
2015/0239320 A1* 8/2015 Eisenhour .......... B60H 1/00864 454/75
2015/0337745 A1* 11/2015 MacNeille .............. F02D 37/02 123/406.48
2018/0105022 A1* 4/2018 Jones ................. B60H 1/00735
2019/0228767 A1 7/2019 Kim et al.
2020/0098355 A1 3/2020 Lee et al.
2023/0156648 A1 5/2023 Newman et al.
2024/0059272 A1 2/2024 Cho et al.
(Continued)

FOREIGN PATENT DOCUMENTS

JP H01278825 A * 11/1989
JP 2010175085 A * 8/2010
KR 20180119929 A 11/2018
(Continued)

*Primary Examiner* — Peter D Nolan
*Assistant Examiner* — Matthew Cobb
(74) *Attorney, Agent, or Firm* — Slater Matsil, LLP

(57) ABSTRACT

An embodiment vehicle includes an air conditioning apparatus and a controller configured to determine whether output of sound guidance is scheduled or input of a voice command is started in response to an inside noise level being higher than a preset reference noise level while air conditioning control is performed through the air conditioning apparatus and, in response to a determination that the output of the sound guidance is scheduled or the input of the voice command is started, to determine air conditioning control adjustment based on an air conditioning target and an inside temperature.

20 Claims, 5 Drawing Sheets

(56) References Cited

U.S. PATENT DOCUMENTS

2025/0346094 A1* 11/2025 Sato .................... B60H 1/3407

FOREIGN PATENT DOCUMENTS

| | | | |
|---|---|---|---|
| KR | 20190088737 | A | 7/2019 |
| KR | 20200033617 | A | 3/2020 |
| KR | 2023010643 | A | 7/2023 |
| KR | 20230103641 | A | 7/2023 |
| KR | 20240027194 | A | 3/2024 |

* cited by examiner

VEHICLE AND METHOD OF SUPPORTING SOUND INPUT/OUTPUT FOR THE SAME

CROSS-REFERENCE TO RELATED APPLICATIONS

This application claims the benefit of Korean Patent Application No. 10-2022-0162850, filed on Nov. 29, 2022, which application is hereby incorporated herein by reference.

TECHNICAL FIELD

The disclosure relates to a vehicle and a method of supporting sound input/output for the same.

BACKGROUND

Recently, an input/output function based on the voice has been actively applied to a vehicle. For example, a driver may input a destination to a navigation system by voice, and turn-by-turn guidance may be output by voice during route guidance.

Such a voice input/output function is largely varied in performance depending on noise inside the vehicle. The inside noise may lower the recognition rate for a driver's speech and make it difficult for a driver to recognize voice guidance output from the vehicle.

In particular, a command input method by voice is generally more effective in preventing a driver from being distracted than a command input method by physical operation, but is more problematic because the driver is rather distracted while repeatedly inputting a voice command and checking a recognition result when a voice recognition rate is low.

Meanwhile, the noise inside the vehicle may be generated by an air conditioning apparatus such as a cooler, a heater, or a fan as well as friction with a road surface and the operation of an engine or motor. Further, the noise generated by the operation of the air conditioning apparatus gets louder as the difference between an air conditioning target temperature and an inside temperature becomes greater, or the speed of wind discharged into the inside by the fan becomes higher.

Such operation of the air conditioning apparatus is required to create or maintain a comfortable inside environment even though it is not essential for driving the vehicle.

Accordingly, there is a need to propose a method of reducing the noise due to the operation of the air conditioning apparatus even while properly ensuring that the inside environment is comfortable, thereby improving the performance of a sound input/output function applied to the vehicle.

SUMMARY

The disclosure relates to a vehicle and a method of supporting sound input/output for the same. Particular embodiments relate to a vehicle and a method of supporting sound input/output for the same, in which air conditioning noise is adjusted to improve a recognition rate when a voice command is input and to allow a driver to easily recognize a sound guide when the sound guide is output.

An embodiment of the disclosure provides a vehicle and a method of supporting sound input/output for the same, in which vehicle noise is effectively controlled when a voice input/output related function is used.

Technical problems solvable by embodiments of the disclosure are not limited to the aforementioned technical problems, and other unmentioned technical problems can be clearly understood from the following description by a person having ordinary knowledge in the art to which the disclosure pertains.

According to an embodiment of the disclosure, a vehicle includes an air conditioning apparatus and a controller configured to determine whether a first condition for activating a sound input/output function is satisfied when an inside noise level is higher than a preset reference noise level while air conditioning control is performed through the air conditioning apparatus, determine whether an air conditioning control level corresponding to an air conditioning target is decreasable based on an inside temperature when the first condition is satisfied, and determine and apply a degree of decreasing the air conditioning control level when the air conditioning control level is decreasable.

For example, the case where the first condition is satisfied may include at least one of a case whether output of sound guidance is scheduled and a case where input of a voice command is started.

For example, the sound guidance may be important sound guidance preset in consideration of content output through a sound.

For example, the controller may determine that the air conditioning control level is decreasable when a difference between the air conditioning target temperature and the inside temperature is smaller than a preset value.

For example, the controller may determine that the air conditioning control level is not decreasable when a discomfort index determined based on an inside dry-bulb temperature and an inside wet-bulb temperature is equal to or greater than a preset value.

For example, the controller may determine the decreasing degree based on the inside noise level.

For example, the decreasing degree may be preset such that a first decreasing degree corresponding to a first inside noise level is equal to or lower than a second decreasing degree corresponding to a second inside noise level higher than the first inside noise level.

For example, the controller may determine the decreasing degree in consideration of a discomfort index determined based on an inside dry-bulb temperature and an inside wet-bulb temperature.

For example, the decreasing degree may be preset such that a third decreasing degree corresponding to a first discomfort index is equal to or higher than a fourth decreasing degree corresponding to a second discomfort index higher than the first discomfort index.

For example, the decreasing degree may be preset to correspond to a plurality of sections for the discomfort index.

For example, the controller may determine the decreasing degree by further considering the inside noise level.

For example, the controller may determine a fifth decreasing degree based on the inside noise level and a sixth decreasing degree, which is an upper limit of the decreasing degree, based on the discomfort index, determine the fifth decreasing degree as a final decreasing degree upon the fifth decreasing degree being equal to or lower than the sixth decreasing degree, and determine the sixth decreasing degree as the final decreasing degree upon the fifth decreasing degree being higher than the sixth decreasing degree.

For example, the controller may control at least one of windspeed and temperature through the air conditioning apparatus.

For example, the controller may control the temperature based on a cooling mode or a heating mode.

For example, when the air conditioning control level is decreased, the controller may perform the air conditioning auxiliary control through the air conditioning auxiliary apparatus provided in the vehicle.

For example, the air conditioning auxiliary apparatus may include at least one of a heater provided in a seat and a cooler provided in the seat.

For example, the controller may perform the air conditioning auxiliary control through the cooler in the cooling mode.

For example, the controller may perform the air conditioning auxiliary control through the heater in the heating mode.

For example, the controller determines a second condition for exiting the sound input/output function in a state where the air conditioning control level is decreased and increases the decreased air conditioning control level again as much as the decreased degree when the second condition is satisfied.

For example, the controller may determine whether the second condition is satisfied based on at least one of content of the sound guidance and content of the voice command.

According to an embodiment of the disclosure, a method of supporting sound input/output for a vehicle includes determining whether a first condition for a sound input/output function is satisfied when an inside noise level is higher than a preset reference noise level while air conditioning control is performed through the air conditioning apparatus, determining whether a second condition for whether an air conditioning control level is decreasable based on an inside temperature when the first condition is satisfied, and determining and applying a degree of decreasing the air conditioning control level when the second condition is satisfied.

With various embodiments of the disclosure as described above, noise generated in the vehicle is reduced through the air conditioning control when the vehicle uses the sound input/output function, so that the vehicle can be improved in the recognition rate for a driver's voice command and the driver can easily recognize the voice guidance output from the vehicle.

Further, the vehicle is improved in the recognition rate for the voice command and thus increased in merchantable quality, and the driver is less distracted as s/he can easily recognize the voice guidance.

In addition, the control may be performed through the existing controller of the vehicle, and thus the performance of the sound input/output function is improved without additional components.

Effects obtainable from embodiments of the disclosure may not be limited by the aforementioned effects, and other unmentioned effects can be clearly understood from the following description by a person having ordinary knowledge in the art to which the disclosure pertains.

DETAILED DESCRIPTION OF ILLUSTRATIVE EMBODIMENTS

Figure 1:
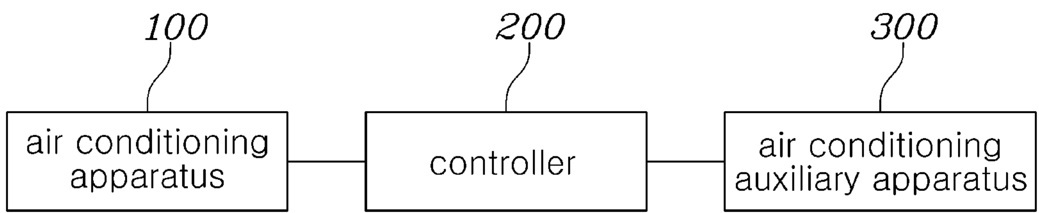
FIG. 1 is a view showing a configuration of a vehicle according to an embodiment of the disclosure.

Regarding embodiments of the disclosure disclosed in this specification or application, the specific structural or functional description is merely illustrative for the purpose of describing the embodiments of the disclosure, and embodiments of the disclosure may be implemented in various forms but should not be construed as being limited to the embodiments set forth in this specification or application.

Because the embodiments of the disclosure may be variously modified and have various forms, specific exemplary embodiments will be illustrated in the drawings and described in detail in this specification or application. However, it should be understood that embodiments of the disclosure are intended not to be limited to the specific embodiments but to cover all modifications, equivalents, or alternatives without departing from the spirit and technical scope of the disclosure.

Unless defined otherwise, all terms used herein including technical or scientific terms have the same meanings as those generally understood by a person having ordinary knowledge in the art to which the disclosure pertains. The terms such as those defined in generally used dictionaries are construed to have meanings matching that in the context of related technology and, unless clearly defined otherwise, are not construed to be ideally or excessively formal.

Hereinafter, embodiments of the disclosure will be described in detail with reference to the accompanying drawings, in which the same or similar components are denoted by the same reference numerals even though they are depicted in different drawings and redundant descriptions thereof will be avoided.

Suffixes "module" and "unit" put after components in the following description are given in consideration of only ease of description and do not have meaning or functions discriminated from each other.

In terms of describing the embodiments of the disclosure, detailed descriptions of related art will be omitted when they may make the subject matter of the embodiments of the disclosure rather unclear. In addition, the accompanying drawings are provided only for a better understanding of the embodiments of the disclosure and are not intended to limit technical ideas of the disclosure. Therefore, it should be understood that the accompanying drawings include all modifications, equivalents, and substitutions within the scope and sprit of the disclosure.

Terms such as "first" and "second" may be used to describe various components, but the components should not be limited by the above terms. In addition, the above terms are used only for the purpose of distinguishing one component from another.

When it is described that one component is "connected" or "joined" to another component, it should be understood that the one component may be directly connected or joined to another component, but additional components may be present therebetween. However, when one component is described as being "directly connected" or "directly coupled" to another component, it should be understood that additional components may be absent between the one component and another component.

Unless the context clearly dictates otherwise, singular forms include plural forms as well.

In the disclosure, it should be understood that the term "include" or "have" indicates that a feature, a number, a step, an operation, a component, a part, or the combination thereof described in the embodiments is present, but does not preclude a possibility of presence or addition of one or more other features, numbers, steps, operations, components, parts or combinations thereof, in advance.

Further, the terms "unit" or "controller" forming part of the names of a motor controller (MCU), a hybrid controller (HCU), etc., are merely terms that are widely used in the naming of a controller for controlling a specific function of a vehicle and should not be construed as meaning a generic function unit.

The controller may include a communication device that communicates with other controllers or sensors in order to control its own functions, a memory that stores an operating system, logic commands, and input/output information, and one or more processors that perform determination, calculation, decision, and the like, which is necessary for the control of the function that is responsible therefor.

In a vehicle and a method of supporting voice input/output for the same according to an embodiment of the disclosure, noise is reduced by decreasing an air conditioning control level in consideration of inside environments when a voice command is input or sound guidance is output. Thus, it is proposed to improve the vehicle in a voice recognition rate and allow an occupant to easily recognize an output guidance sound of the vehicle, even while properly ensuring that the inside environment is comfortable.

Here, the voice recognition rate is generally affected by a signal-to-noise ratio (SNR), i.e., a ratio between a level of a voice signal and a level of noise. An SNR value may be determined by the following Equation 1.

$$SNR_{dB} = P_{signal,dB} - P_{noise,dB} \qquad \text{Equation 1}$$

Thus, the higher the SNR value, the higher the voice recognition rate. In the case of a voice signal having a constant level, the higher the SNR value, the lower the level of noise. In other words, the lower the level of noise, the higher the voice recognition rate. Therefore, an embodiment of the disclosure improves the voice recognition rate by reducing noise due to operation of an air conditioning apparatus.

Here, the air conditioning control level may refer to a level of control performed to achieve a target of air conditioning control. For example, the higher the target windspeed of the air conditioning control, the higher the air conditioning control level for achieving the target windspeed. In addition, the greater the difference between the target temperature of the air conditioning control and an inside temperature, the higher the air conditioning control level for achieving the target temperature.

As the air conditioning control level is decreased, the noise level due to the operation of an air conditioning apparatus becomes lower, thereby improving the voice recognition rate and clearly giving the sound guidance.

First, a configuration of a vehicle according to an embodiment will be described with reference to FIG. 1.

FIG. 1 is a view showing the configuration of the vehicle according to an embodiment of the disclosure.

Referring to FIG. 1, the vehicle according to an embodiment may include an air conditioning apparatus 100, a controller 200, and an air conditioning auxiliary apparatus 300. Although FIG. 1 illustrates components related to the disclosure, the vehicle according to an embodiment may, of course, include more or fewer components than those illustrated in FIG. 1. Below, such components will be described.

First, the air conditioning apparatus 100 refers to an apparatus for controlling the indoor environments of the vehicle through heating, ventilation, air conditioning, etc., and may also be called an air conditioner or a heating, ventilation & air conditioning (HVAC) system.

The air conditioning apparatus 100 may operate in response to a user's input and a control signal corresponding to the input and may include an evaporator, a compressor, a condenser, a blower fan, a motor for operating the evaporator, the compressor, the condenser and the blower fan, etc.

In addition to the foregoing air conditioning apparatus 100, the air conditioning auxiliary apparatus 300 refers to an apparatus for providing comfort to a driver or the like user of the vehicle and may for example include a heating seat, a ventilating seat, etc.

The air conditioning auxiliary apparatus 300, such as the heating seat and the ventilating seat, does not directly affect the inside environments compared to the air conditioning apparatus 100 but operates making a low noise. Therefore, when the air conditioning control level of the air conditioning apparatus is decreased to reduce air conditioning noise, the air conditioning auxiliary apparatus 300 may operate to compensate for the loss of the comfort of the inside environment to some extent.

Meanwhile, the controller 200 controls the air conditioning apparatus 100 and the air conditioning auxiliary apparatus 300, thereby reducing the air conditioning noise to support a voice input/output function. Such components of the controller 200 and their functions will be described in detail below with reference to FIG. 2.

Figure 2:
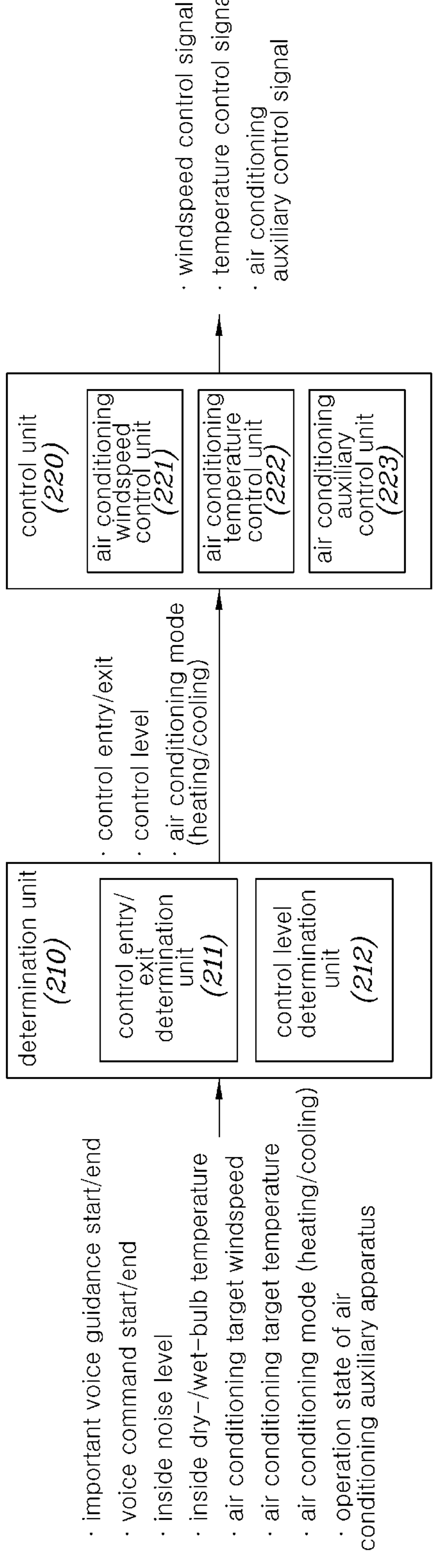
FIG. 2 is a view showing a configuration of a controller according to an embodiment of the disclosure.

FIG. 2 is a view showing a configuration of a controller according to an embodiment of the disclosure.

Referring to FIG. 2, the controller 200 of the vehicle according to an embodiment may determine whether at least one of a case where a sound guidance output is scheduled and a case where a voice command input is started is satisfied when an inside noise level is higher than a preset reference noise level while the air conditioning apparatus 100 is performing the air conditioning control and may determine air conditioning control adjustment based on an air conditioning target and an inside temperature when the at least one of the cases is satisfied.

To this end, the controller 200 may have input information about whether important voice guidance starts or ends, whether a voice command starts or ends, an inside noise level, an inside temperature including inside dry-bulb and wet-bulb temperatures, an air conditioning control target including an air conditioning target windspeed and an air conditioning target temperature, an air conditioning control level, an air conditioning mode such as a heating mode or a cooling mode, operation states of the air conditioning auxiliary apparatus, etc.

Here, the sound guidance may include information in a voice form like a navigation guidance voice, but is not necessarily limited thereto. For example, the sound guidance may include a warning sound as well as a voice.

Further, the sound guidance, which is used as a condition for entering the sound input/output support control according to an embodiment, may include any types of sound guidance output through a loudspeaker and may also restrictively include preset types of sound guidance to prevent discomfort from occurring or usage from decreasing due to frequent air conditioning control.

In particular, the sound guidance, used as the condition for entering the sound input/output support control, may restrictively include preset important sound guidance in consideration of content output through a sound. For example, a turn-by-turn guidance voice of a navigation system, a warning sound for a speed camera, etc., of which content is directly connected to a driver's driving control, may be set as the important sound guidance.

Further, information about the start and end of inputting the voice command and the start and end of outputting the sound guidance such as the important sound guidance may be provided by an audio/video/navigation (AVN) system, but is not necessarily limited thereto. Alternatively, the information may be variously provided depending on the sources of the sound guidance.

The source of information about the start and end of inputting the voice command may also be similar to the source of the information about the start and end of outputting the sound guidance. For example, when a voice recognition function is activated in the AVN system as a driver controls a voice recognition button on a handle to input a voice command, the start of inputting the voice command may be transmitted to the controller 200.

Further, when it is determined in the AVN system whether the voice command is successfully or unsuccessfully recognized, or when a driver terminates the voice recognition function, the AVN system may inform the controller 200 of the end of inputting the voice command. Of course, this is merely an example and not limited thereto.

The inside noise level may be obtained through a microphone inside the vehicle and may also be obtained with reference to a previously prepared lookup table and the like information corresponding to the air conditioning control target, the air conditioning control level, etc. Further, the inside temperature may be obtained through a thermometer and the like inside the vehicle and may specifically include a dry-bulb temperature and a wet-bulb temperature.

The air conditioning control target may include an air conditioning target windspeed and an air conditioning target temperature, which may be set by a driver or the like. In addition, the air conditioning mode may include the heating mode and the cooling mode. The air conditioning control target and the air conditioning mode may be separately input to the controller 200 or may also be obtained through an upper or separate controller or the like.

Meanwhile, the controller 200 of the vehicle according to an embodiment may have output information such as a windspeed control signal, a temperature control signal, and an air conditioning auxiliary control signal for the air conditioning control to support the sound input/output. Further, the output control signals may be transmitted to the air conditioning apparatus 100 or the air conditioning auxiliary apparatus 300.

The controller 200 may be implemented to involve the air conditioning control, and it may be efficient that the controller 200 is implemented as a function of an upper controller that generally performs the air conditioning control. This is merely an example, but is not limited thereto.

Below, the configuration of the controller 200 for supporting the sound input/output will be described in detail.

The controller 200 for supporting the sound input/output may include a determination unit 210 and a control unit 220. The determination unit 210 may include a control entry/exit determination unit 211 and a control level determination unit 212, and the control unit 220 may include an air conditioning windspeed control unit 221, an air conditioning temperature control unit 222, and an air conditioning auxiliary control unit 223. Although FIG. 2 illustrates components related to an embodiment of the disclosure, the controller for supporting the sound input/output may, of course, include more or fewer components than those illustrated in FIG. 2.

First, the control entry/exit determination unit 211 of the determination unit 210 may determine whether to enter or exit the noise reduction control of the air conditioning apparatus in order to support the sound input/output according to an embodiment based on the foregoing input information.

For example, the control entry/exit determination unit 211 may determine whether or not a preset entry condition is satisfied. For example, the control entry/exit determination unit 211 may determine that the entry condition is satisfied ① when the air conditioning control is being performed through the air conditioning apparatus 100, ② when the inside noise level is higher than the preset reference noise level, ③ when a first condition for activating the sound input/output function is satisfied, and ④ when the air conditioning control level corresponding to the air conditioning target is decreasable.

Here, the case where the first condition for activating the sound input/output function is satisfied may include at least one of the case where the sound guidance output is scheduled and the case where the voice command input is started. In this case, the sound guidance may be the important sound guidance previously set in consideration of content output through the sound. Further, the reference noise level may be previously set by a test as a noise level at which the voice recognition rate is not higher than a certain level, but is not limited thereto.

Meanwhile, the controller 200 may determine whether the air conditioning control level is decreasable based on the air conditioning target and the inside temperature and may determine a degree of decreasing the air conditioning control level when the air conditioning control level is decreasable, thereby determining the air conditioning control adjustment.

In this case, whether the air conditioning control level is decreasable may be determined based on the inside temperature. Specifically, the control entry/exit determination unit 211 may determine that the air conditioning control level is decreasable when a difference between the air conditioning target temperature and the inside temperature is smaller than a preset value.

Further, a discomfort index determined based on the inside dry-bulb temperature and the wet-bulb temperature may be additionally taken into account in order to determine whether the air conditioning control level is decreasable. Here, the discomfort index may be obtained by the following Equation 2.

$$DI = 0.72(T_a + T_w) + 40.6 \qquad \text{Equation 2}$$

Here, DI is a discomfort index, $T_a$ is a dry-bulb temperature, and $T_w$ is a wet-bulb temperature.

In more detail, the control entry/exit determination unit 211 may determine that the air conditioning control level is not decreasable when the discomfort index obtained by the foregoing equation is equal to or greater than a preset value.

As above, the control entry/exit determination unit 211 determines whether the entry condition is satisfied and allows the control for supporting the sound input/output to be performed when the entry condition is satisfied, thereby preventing a driver or the like from experiencing considerable discomfort due to unnecessary change in the air conditioning control or the decreased air conditioning control level.

Further, the control entry/exit determination unit 211 may determine a second condition of inactivating the sound input/output function while performing the control for supporting the sound input/output.

In this case, the second condition of exiting the sound input/output function may be determined based on at least one of the content of the sound guidance and the content of the voice command.

In more detail, the second condition may be satisfied when no follow-up sound guidance is expected in light of the content of the sound guidance, and the content of the sound guidance satisfying the second condition may be set in advance. For example, when the content of the sound guidance includes "route guidance will be ended" and the like, no follow-up guidance is expected, thereby determining that the second condition is satisfied.

In the same way, the second condition may be satisfied even when no follow-up command is expected in light of the content of the voice command, and the content of the voice command satisfying the second condition may be set in advance. For example, when the content of the voice command includes "turn off the air conditioner," "turn off the navigation," etc., no follow-up command is expected, thereby determining that the second condition is satisfied.

As mentioned above, the control entry/exit determination unit 211 determines whether the entry condition is satisfied and allows the control for supporting the sound input/output to be performed when the entry condition is satisfied. Therefore, when it is no longer necessary to support the sound input/output, the inside air conditioning control is normally performed by exiting the sound input/output support control, thereby preventing a driver's inconvenience.

The control level determination unit 212 determines the degree of decreasing the air conditioning control level when the control entry condition is satisfied.

The degree of decreasing the air conditioning control level may be determined based on the inside noise level and may be given as a preset value to correspond to the inside noise level.

Specifically, the decreasing degree may be set so that a first decreasing degree corresponding to a first inside noise level can be equal to or lower than a second decreasing degree corresponding to a second inside noise level higher than the first inside noise level.

For example, the decreasing degree may be set to be proportional to the inside noise level. Thus, it is possible to reduce the air conditioning noise so that the inside noise level can approximate the reference noise level.

Further, the degree of decreasing the air conditioning control level may be determined in consideration of the foregoing discomfort index, and the decreasing degree may be determined as a preset value to correspond to the discomfort index.

In this case, the decreasing degree may be set so that a third decreasing degree corresponding to a first discomfort index can be equal to or greater than a fourth decreasing degree corresponding to a second discomfort index greater than the first discomfort index. For example, the decreasing degree may be set to decrease as the discomfort index becomes higher and may be set to correspond to a plurality of sections for the discomfort index.

For example, the decreasing degree may be determined with reference to the following Table 1.

TABLE 1

| Range of discomfort index | Level of discomfort index | Decreasing degree | Air conditioning control level | |
|---|---|---|---|---|
| | | | Control windspeed | Control temperature |
| DI ≥ 80 | Very high | Not decreasable | — | — |
| 75 ≤ DI < 80 | High | Low | Target windspeed - one step | Target temperature ± $T_a$(° C.) |
| 68 ≤ DI < 75 | Normal | Middle | Target windspeed - two steps | Target temperature ± $T_b$(° C.) |
| DI < 68 | Low | High | Target windspeed - three steps | Target temperature ± $T_c$(° C.) |

Thus, the control for supporting the sound input/output is performed by reflecting the comfort to a driver and the like. Further, the degree of decreasing the air conditioning control level may be determined considering both the inside noise level and the discomfort index.

For example, the control level determination unit 212 may determine a fifth decreasing degree based on the inside noise level, determine a sixth decreasing degree, i.e., the upper limit of the decreasing degree based on the discomfort index, and then determine the fifth decreasing degree as the final decreasing degree for the air conditioning control level when the fifth decreasing degree is equal to or lower than the sixth decreasing degree, and determine the sixth decreasing degree as the final decreasing degree when the fifth decreasing degree is higher than the sixth decreasing degree (i.e., higher than the lower limit of the decreasing degree).

Next, the components of the control unit 220 will be described.

The control unit 220 may perform the air conditioning control based on the air conditioning control adjustment determined by the control level determination unit 212 and control at least one of the windspeed and the temperature through the air conditioning apparatus 100.

In more detail, the air conditioning windspeed control unit 221 may control the air conditioning windspeed based on the decreased air conditioning control level, and the air conditioning temperature control unit 222 may control the air conditioning temperature based on the decreased air conditioning control level. In particular, when the temperature is controlled, the air conditioning mode (e.g., for cooling or heating) may be taken into account.

Further, the air conditioning auxiliary control unit 223 may perform the air conditioning auxiliary control through the air conditioning auxiliary apparatus 300 when the air conditioning control level is decreased. For example, the air conditioning auxiliary control may be performed by operating a heater provided in a seat (i.e., a heating seat) when the air conditioning mode is the heating mode, and the air conditioning auxiliary control may be performed by operating a cooler provided in a seat (i.e., a ventilating seat) when the air conditioning mode is the cooling mode. Thus, it is possible to compensate for the loss of the comfort of the inside environment to some extent even though the air conditioning control level is decreased.

Below, the processes performed by the configuration of FIG. 2 will be described with reference to FIGS. 3 to 5.

Figure 3:
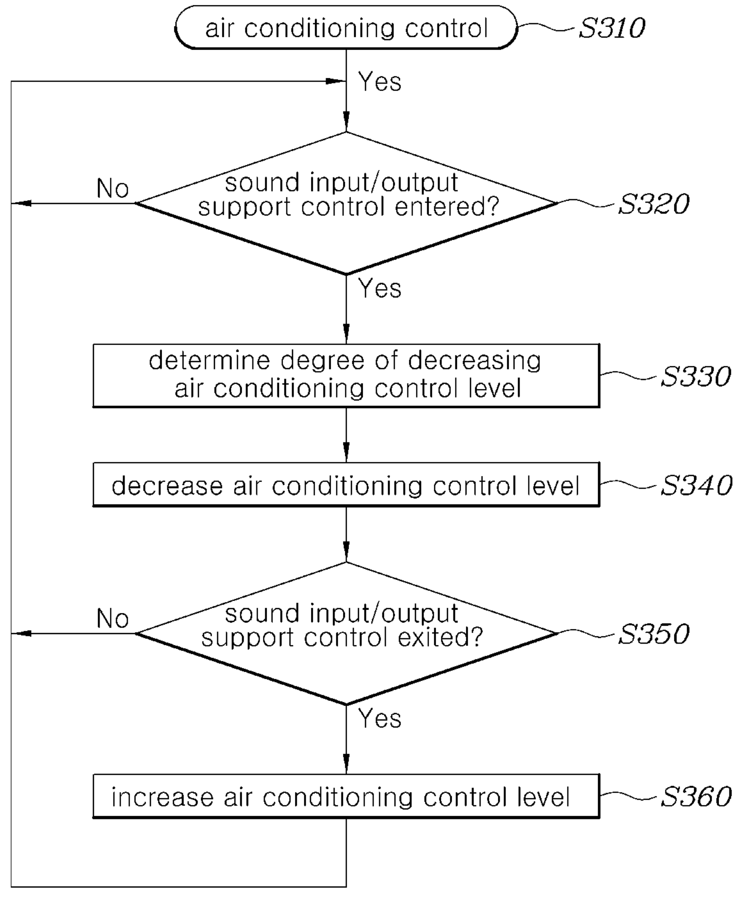
FIG. 3 is a flowchart for schematically describing a process of a method of supporting sound input/output for a vehicle according to an embodiment of the disclosure.

FIG. 3 is a flowchart for schematically describing a process of a method of supporting sound input/output for a vehicle according to an embodiment of the disclosure.

Referring to FIG. 3, while the air conditioning control is being performed by the air conditioning apparatus (S310), the control entry/exit determination unit 211 determines whether to enter the control for supporting the sound input/output (S320).

When the control for supporting the sound input/output is started (Yes in S320), the control level determination unit 212 may determine the degree of decreasing the air conditioning control level (S330) and transmits the determined decreasing degree to the control unit 220.

The control unit 220 decreases the air conditioning control level based on the determined decreasing degree and performs the air conditioning control based on the decreased air conditioning control level (S340).

Then, the control entry/exit determination unit 211 determines whether to exit the sound input/output support control (S350). When the sound input/output support control is exited (Yes in S350), the control unit 220 increases the air conditioning control level again to perform the air conditioning control (S360).

Below, the process of determining whether to enter the sound input/output support control in the control entry/exit determination unit 211 will be described in detail with reference to FIG. 4.

Figure 4:
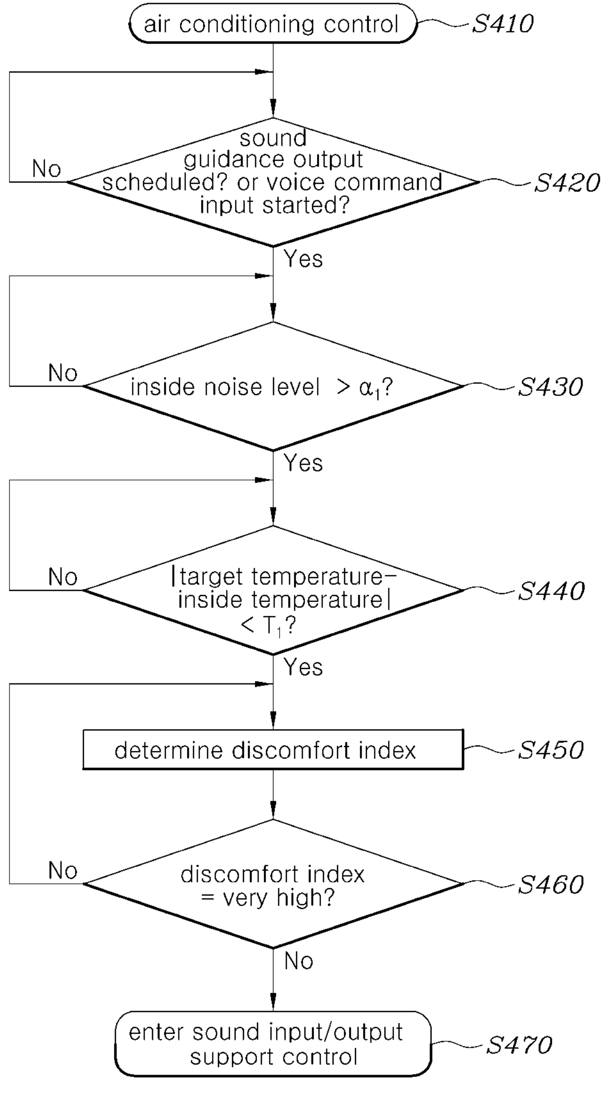
FIG. 4 is a flowchart for describing a process of entering control for supporting sound input/output according to an embodiment of the disclosure.

FIG. 4 is a flowchart for describing a process of entering control for supporting sound input/output according to an embodiment of the disclosure.

First, while the air conditioning apparatus 100 is performing the air conditioning control (S410), the control entry/exit determination unit 211 determines whether the first condition for activating the sound input/output function is satisfied or not based on at least one of whether the sound guidance output is scheduled and whether the voice command input is started (S420).

When the sound guidance output is scheduled or when the voice command input is started (Yes in S420), the control entry/exit determination unit 211 determines that the first condition is satisfied and compares the inside noise level with a reference noise level $\alpha_1$ (S430).

When the inside noise level is higher than the reference noise level $\alpha_1$ (Yes in S430), the control entry/exit determination unit 211 compares a difference between the air conditioning target temperature and the inside temperature with a preset value $T_1$ in order to determine whether to decrease the control level (S440).

When the difference between the air conditioning target temperature and the inside temperature is smaller than the preset value $T_1$ (Yes in S440), the control entry/exit determination unit 211 determines the discomfort index based on the inside dry-bulb temperature and the inside wet-bulb temperature (S450).

When the determined discomfort index falls within the range corresponding to the very high level in the above Table 1 (Yes in S460), the control entry/exit determination unit 211 determines that the sound input/output support control is impossible and does not enter the control. On the other hand, when the level of the determined discomfort index does not correspond to the very high level in the above Table 1 (No in S460), the control entry/exit determination unit 211 determines that the control entry is possible, and the control unit 220 enters the control for supporting the sound input/output (S470).

The processes after entering the sound input/output support control through the foregoing processes will be described below with reference to FIG. 5.

Figure 5:
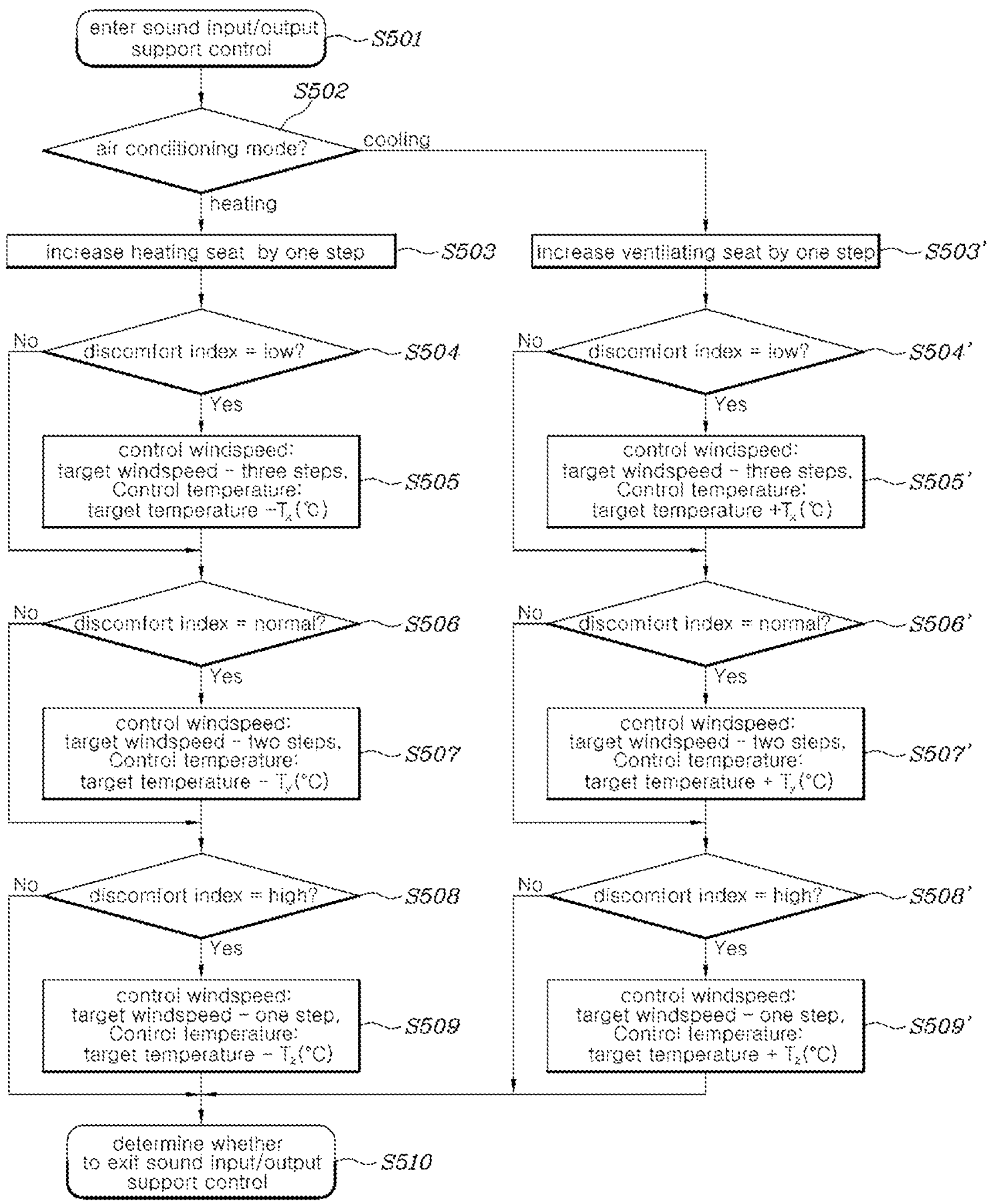
FIG. 5 is a flowchart for describing an air conditioning control process after entering control for supporting sound input/output according to an embodiment of the disclosure.

FIG. 5 is a flowchart for describing an air conditioning control process after entering control for supporting sound input/output according to an embodiment of the disclosure.

FIG. 5 is based on the premise that the sound input/output support control is performed with reference to the Table 1.

Referring to FIG. 5, after entering the sound input/output support control (S501), the control unit 220 controls the air conditioning apparatus 100 and the air conditioning auxiliary apparatus 300 according to whether the air conditioning mode is the cooling mode or the heating mode.

First, the air conditioning auxiliary control unit 223 may perform the air conditioning auxiliary control according to whether the air conditioning mode is the cooling mode or the heating mode (S502) before decreasing the air conditioning control level. In the case of the heating mode, the air conditioning auxiliary control may be performed to increase the operation level of a heating seat by one step (S503). In the case of the cooling mode, the air conditioning auxiliary control may be performed to increase the operation level of the ventilating seat by one step (S503').

Then, when the determined discomfort index falls within the range corresponding to the low level (Yes in S504, Yes in S504'), the air conditioning windspeed control unit 221 may decrease the air conditioning control level so that the control windspeed level can be weakened from the target windspeed level by three steps and the control temperature level can be changed by $T_x$ from the air conditioning target temperature according to the air conditioning mode (S505, S505').

When the determined discomfort index falls within the range corresponding to the normal level (Yes in S506, Yes in S506'), the air conditioning windspeed control unit 221 may decrease the air conditioning control level so that the control windspeed level can be weakened from the target windspeed level by two steps and the control temperature level can be changed by Ty from the air conditioning target temperature according to the air conditioning mode (S507, S507').

When the determined discomfort index falls within the range corresponding to the high level (Yes in S508, Yes in S508'), the air conditioning windspeed control unit 221 may decrease the air conditioning control level so that the control windspeed level can be weakened from the target windspeed level by one step and the control temperature level can be changed by $T_2$ from the air conditioning target temperature according to the air conditioning mode (S509, S509').

After the foregoing processes, the control entry/exit determination unit 211 determines whether to exit the sound input/output support control by determining whether the second condition for exiting the sound input/output function is satisfied (S510).

With various embodiments of the disclosure as described above, noise generated in the vehicle is reduced through the air conditioning control when the vehicle uses the sound input/output function, so that the vehicle can be improved in the recognition rate for a driver's voice command and the driver can easily recognize the voice guidance output from the vehicle.

Further, the vehicle is improved in the recognition rate for the voice command and thus increased in merchantable quality, and the driver is less distracted as s/he can easily recognize the voice guidance.

In addition, the control may be performed through the existing controller of the vehicle, and thus the performance of the sound input/output function is improved without additional components.

Although specific embodiments of the disclosure are illustrated and described, it will be obvious to a person having ordinary knowledge in the art that a variety of improvements and changes can be made in the disclosure without departing from the technical idea of the disclosure defined in the appended claims.

What is claimed is:

1. A vehicle comprising:
an air conditioning apparatus; and
a controller configured to:
control the air conditioning apparatus;
determine whether output of sound guidance is scheduled or input of a voice command is started in response to an inside noise level being higher than a preset reference noise level while air conditioning control is performed through the air conditioning apparatus;
determine whether an air conditioning control level is decreasable based at least in part on a discomfort index and a preset value, wherein the discomfort index is determined based on an inside dry-bulb temperature and an inside wet-bulb temperature; and
in response to a determination that the output of the sound guidance is scheduled or the input of the voice command is started and that the air conditioning control level is decreasable, adjusting the control of the air conditioning apparatus based on an air conditioning target and an inside temperature.

2. The vehicle of claim 1, wherein the sound guidance comprises important sound guidance preset considering content output through a sound.

3. The vehicle of claim 1, wherein the controller is further configured to control windspeed or temperature through the air conditioning apparatus based on the air conditioning target and the inside temperature.

4. The vehicle of claim 3, wherein the controller is further configured to control the temperature based on a cooling mode or a heating mode.

5. The vehicle of claim 1, wherein the controller is further configured to:
determine whether to exit the sound guidance or the voice command based on content of the sound guidance or content of the voice command; and
re-determine the control of the air conditioning apparatus in response to a determination to exit the sound guidance or the voice command.

6. The vehicle of claim 1, wherein the controller is further configured to:
determine whether the air conditioning control level is decreasable based on the air conditioning target and the inside temperature; and
in response to a determination that the air conditioning control level is decreasable, adjust the control of the air conditioning apparatus based on a decreasing degree of the air conditioning control level.

7. The vehicle of claim 6, wherein the controller is further configured to determine that the air conditioning control level is decreasable based on a difference between the air conditioning target and the inside temperature being smaller than a second preset value.

8. The vehicle of claim 7, wherein the controller is further configured to determine that the air conditioning control level is not decreasable based on the discomfort index being equal to or greater than the preset value.

9. The vehicle of claim 6, wherein the controller is further configured to determine the decreasing degree based on the inside noise level.

10. The vehicle of claim 9, wherein the decreasing degree is preset such that a first decreasing degree corresponding to a first inside noise level is equal to or lower than a second decreasing degree corresponding to a second inside noise level that is higher than the first inside noise level.

11. The vehicle of claim 6, wherein the controller is further configured to determine the decreasing degree in consideration of the discomfort index determined based on the inside dry-bulb temperature and the inside wet-bulb temperature.

12. The vehicle of claim 11, wherein the controller is further configured to determine the decreasing degree by further considering the inside noise level.

13. The vehicle of claim 12, wherein the controller is further configured to:
determine a fifth decreasing degree based on the inside noise level and a sixth decreasing degree, which is an upper limit of the decreasing degree, based on the discomfort index;
determine the fifth decreasing degree as a final decreasing degree in response to the fifth decreasing degree being equal to or lower than the sixth decreasing degree; and
determine the sixth decreasing degree as the final decreasing degree in response to the fifth decreasing degree being higher than the sixth decreasing degree.

14. The vehicle of claim 11, wherein the decreasing degree is preset such that a third decreasing degree corresponding to a first discomfort index is equal to or higher than a fourth decreasing degree corresponding to a second discomfort index higher than the first discomfort index.

15. The vehicle of claim 14, wherein the decreasing degree is preset to correspond to a plurality of sections for the discomfort index.

16. The vehicle of claim 1, wherein the controller is further configured to perform air conditioning auxiliary control through an air conditioning auxiliary apparatus provided in the vehicle, based on adjusting the control of the air conditioning apparatus.

17. The vehicle of claim 16, wherein the air conditioning auxiliary apparatus comprises a heater provided in a seat or a cooler provided in the seat.

18. The vehicle of claim 17, wherein the controller is further configured to perform the air conditioning auxiliary control through the cooler in a cooling mode.

19. The vehicle of claim 17, wherein the controller is further configured to perform the air conditioning auxiliary control through the heater in a heating mode.

20. A method of supporting sound input/output for a vehicle, the method comprising:
determining whether output of sound guidance is scheduled or input of a voice command is started in response to an inside noise level being higher than a preset reference noise level while air conditioning control is performed through an air conditioning apparatus;
determining whether an air conditioning control level is decreasable based at least in part on a discomfort index and a preset value, wherein the discomfort index is determined based on an inside dry-bulb temperature and an inside wet-bulb temperature; and
in response to a determination that the output of the sound guidance is scheduled or the input of the voice command is started and that the air conditioning control level is decreasable, adjusting the control of the air conditioning apparatus based on an air conditioning target and an inside temperature.

* * * * *